May 5, 1970  K. A. STETSON  3,509,761
HOLOGRAPHIC METHOD OF DEFORMATION ANALYSIS
Filed June 6, 1968
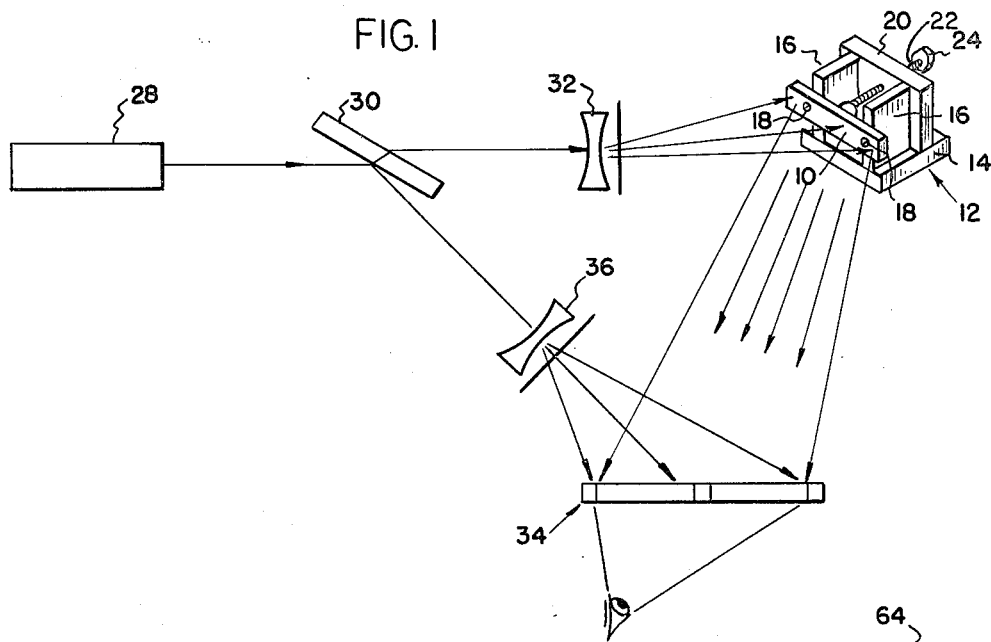
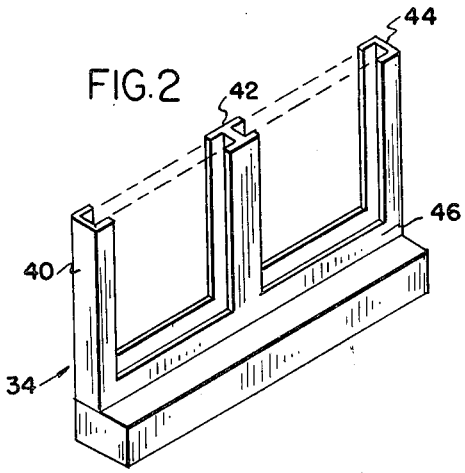
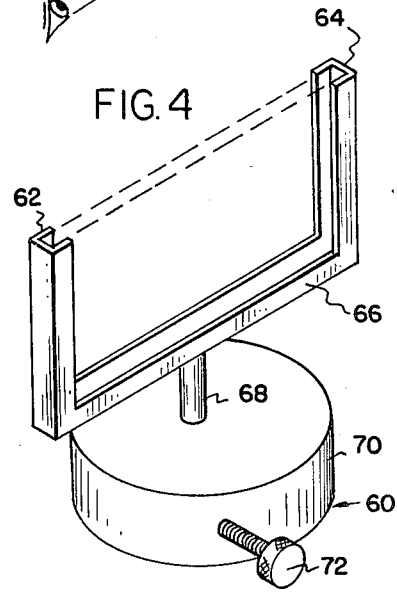
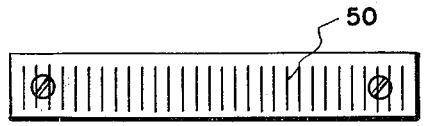
INVENTORS
KARL A. STETSON
ATTORNEYS

3,509,761
HOLOGRAPHIC METHOD OF DEFORMATION ANALYSIS

Karl A. Stetson, Stockholm, Sweden, assignor, by mesne assignments, to GCOptronics, Inc., Ann Arbor, Mich., a corporation of Delaware
Filed June 6, 1968, Ser. No. 735,089
Int. Cl. G01b 5/30
U.S. Cl. 73—88                    7 Claims

ABSTRACT OF THE DISCLOSURE

To nondestructively measure the deformation which occurs in a member at successive increments of a variable such as load, temperature, pressure or time, a hologram is made employing two exposures on the same plate of the member at two separated conditions of the variable. When the second exposure is made of the first plate, a simultaneous initial exposure is made of a second photographic plate. Simultaneously with the second exposure of the second plate, an initial exposure is made of a third plate. This process is continued through all of the increments of the variable. The visual reconstructions of the object as seen through the developed holograms will reveal fringe lines arrayed in accordance with a function of the displacement of the member between the two exposures of that hologram. In a second embodiment a plurality of exposures at different loadings are made on the same plate with the angle of the plate with respect to the object being modified between successive increments of the variable. The optical reconstructions containing the fringe lines may then be successively viewed through the same developed hologram to disclose the successive deformations in the member under changes in the variable.

BACKGRONUD OF THE INVENTION

Field of the invention

This invention relates to nondestructive methods of determining and recording the deformation of an object at successive increments of a controlled variable, such as load, temperature, pressure or time, involving the formation of holograms by exposure of a photographic media to coherent light reflected from the object at a plurality of increments of the controlled variable and the observation of the optical reconstructions of the object through the completed hologram.

Description of the prior art

Methods and apparatus for forming holograms have undergone intensive development and improvement in the past few years. These holograms consist of photographic records of the interference pattern between light (generally coherent light as produced by a laser) arriving at a photographic media directly from a source, and light which is reflected from an object illuminated by the source. Upon development of the photographic media and proper illumination of the resulting hologram an optical reconstruction of the original object, having optical properties identical to those of the object, may be viewed.

Interferometric methods have also been developed for detecting minute dimensional changes in a object by forming a "double exposure" hologram wherein the photographic plate is exposed to the light reflected from the object, and the light from the source, two times, while the object has undergone some change in dimension between the two exposures. When such a hologram is properly illuminated and viewed, after development, the optical reconstruction of the object will appear with fringe lines superimposed thereon, arrayed in a pattern which is a function of the displacement of the member between the two states. Measurements may be made of the fringe lines to determine the exact displacement of any point on the member visible on the hologram between its two states.

SUMMARY OF THE PRESENT INVENTION

The present invention contemplates an extenson of this method which provides information relating to the deformation of the object at a series of successive conditions of the controlled variable. The information provided is continuous in that each point of the controlled variable which is observed represents a base point of a pair of readings, usually one of increasing magnitude of the controlled variable and the other of decreasing magnitude. This allows the data relating to the deformation of the member between successive modifications of the controlled variable to be summed in order to determine the gross deformation over a larger range of the controlled variable representing the sum of a series of smaller increments.

One of the difficulties associated with extending the double exposure technique to a multiple exposure technique is associated with the necessity of absolutely preserving the geometry of optical setup between exposures. Since the interferometric holographic technique is capable of detecting variations in the dimensions of the observed member on the order of a fraction of the wave length of the light being used, even the slightest change in position in any of the optical components between exposures would result in unacceptable modifications of the final hologram. Accordingly, any successful method of forming a plurality of holograms involving exposures at successive increments of a controlled variable must eliminate the handling of plates between successive exposures and also must provide means for ensuring that the secondary exposure of one plate and the initial exposure of the successive plate occur with identical geometry. Because of the difficulty of maintaining environmental control over a sustained period of time a successful method must also provide for the simultaneous second exposure of one hologram and the initial exposure of the next. In certain situations the independent variable may be time itself, with the dimensional changes occurring as a result of creep or the like.

The present invention therefore broadly contemplates a method of recording the dimensional changes which occur in an object between a plurality of successive increments of a controlled variable, including the formation of a plurality of double exposure holograms with the two exposures being made at separated states of the controlled variable and with initial exposures being made of one plate and simultaneous secondary exposures being made of another plate, at all observed points with the exception of the end points of the series.

The following description discloses two embodiments of the present invention. In the first, a plate holder capable of supporting a pair of photographic plates is disposed in a normal holographic optical arrangement so that both of the plates are subjected to the reflected light from the object and the reference beam. To initiate the study a single plate is disposed within the holder and an exposure is made at a base point of the controlled variable. The variable is then modified and a second plate is inserted in the holder. Simultaneous exposures are made of both plates and the first plate is removed for processing and replaced by a third, unexposed plate. At a second point in the range of the controlled variable both the second and third plates are exposed and then the second plate is removed for processing and replaced with a fourth plate. This process is continued through the entire range of the controlled variable. When the developed holograms are properly illuminated a series of optical reconstructions of the object are visible, each containing a different fringe family which represents the interference between the virtual images of the reconstructions of the object of the two states at which exposures were made for that plate. These fringe families may be analyzed with known techniques to determine the pattern and extent of the movement between each pair of points. The incremental deformation may be algebracially summed to determine the effect of grosser modifications of the controlled variable.

In a second embodiment, a single photographic plate is supported in the holographic optical arrangement so that it may be pivoted about an axis normal to the line between it and the object. The plate is first exposed at a base point and then at a second point in the controlled variable range. The plate is then pivoted through a small arc so as to present a different angle to the holographic setup and a second exposure is made. The controlled variable is then modified again and another exposure of the plate is made at this second angle. The plate is then pivoted to a new disposition and another exposure is made. In this manner a plurality of double exposure holograms are made on a single plate with a small angle separating each. When the plate is developed and the hologram properly illuminated, one of a plurality of optical reconstructions of the object will be visable, the reconstruction that is visible depending upon the angle between the viewer and the plate. Each of the optical reconstructions will contain a fringe array of the same nature as those obtained with a normal hologram.

It should be recognized that in this second embodiment wherein a plurality of holograms are formed at spaced angles on a single photographic plate, a time interval exists between the recording of a single state as a second exposure on one hologram and as a first exposure of the next hologram. The time interval is dependent upon the speed at which the photographic plate can be moved with respect to the other apparatus and successive exposures made. In certain systems the inaccuracies introduced into the readings because of this time interval may prevent the use of the second embodiment and it may be necessary to employ the method of the first embodiment. In other systems, where the condition of the object may be stabilized at particular states, the inaccuracies introduced by this approximation will not be significant.

The following description of the two preferred embodiments disclosed setups for practicing the present method on objects to which increments of static load and of a temperature range have been applied. It should be understood that the invention is useful to determine the effects on an object, of any variable that modifies the dimensions of the object. For example, the method may be used to determine the permanent deformation which occurs in a structural member when a load is applied and then removed. Holograms taken before application of the load, upon application of the load and after removal of the load will disclose evidence of even the minutest permanent deformation of the members as well as its deformation under load. As mentioned previously, creep over time may also be analyzed with the present method.

Other applications, objects and advantages of the present invetnion will be made apparent by the following detailed description of two preferred embodiments of the invention. The description makes reference to the accompanying drawings in which:

FIG. 1 is a semi-schematic view of apparatus for practice of the present invention as employed to analyze the effect of static loading upon a beam;

FIG. 2 is a perspective view of a special photographic plate holder used with the apparatus of FIG. 1;

FIGS. 3A and 3B illustrate the fringe families visible on the optical reconstruction of a pair of successive holograms formed by the apparatus of FIG. 1; and FIG. 4 illustrates a second embodiment of apparatus for practicing the method of the present invention wherein a plurality of holograms are formed at successive angles on a single photographic plate.

A first embodiment of apparatus for practicing the method of the present invention, as disclosed in FIG. 1, is used to measure dimensional changes which occur as a result of static loading of a member. The test specimen is illustarted as an elongated rectangular beam 10, which is supported on a test stand, generally indicated at 12. The stand has a base 14 and a pair of parallel upright members 16 which rise above the base. The beam is fastened to one end of the uprights, in a horizontal attitude, by a pair of screws 18. A third upright 20 which extends from the base 14 normally to the uprights 16, at their rear ends, has a central aperture which supports a screw 22 so that the forward end of the screw abuts the rear of the beam 10. A hexagonal head 24 on the rear end of the screw allows the position of the screw to be adjusted with respect to the upright 20 so as to vary the load applied to the beam 10 by the end of the screw. The torque required to rotate the screw at any particular setting provides an indication of the static load applied to the beam 10.

The forward face of the beam 10 is illuminated with coherent light form a laser 28. The laser's beam passes through a beam splitter 30 and a conventional spreading lens and pin hole assembly 32. A plate holder, generally indicated at 34, is supported so as to receive reflected illumination from the beam 10. The plate holder is also subjected to a reference light beam derived from the beam splitter 30, and passed through a second lens and pin hole assembly 36. When the laser is energized a photographic plate supported in the holder 34 is subjected to both reflected light and the reference beam and the illumination levels are such that the plate records the interference pattern between the two.

FIG. 2 illustrates a plate holder 34 which is intended for use with the apparatus of FIG. 1. It has three vertical arms 40, 42 and 44 extending upwardly from a horizontal member 46. The member 46 is in turn retained in a base 48. The end arms 40 and 42 are channel shaped with their openings facing toward one another. The horizontal member 46 similarly has an upwardly extending channel which connects at its end with the center channels of the members 40 and 42. The member 42 is H-shaped in configuration with its openings facing those of the end members and the channel in the bottom member.

The plate holder 34 is adapted to simultaneously support one photographic plate between the arms 40 and 42 and another plate between the arms 42 and 44. The bottoms of the plates fit in the channel in the member 46 and the edges fit in the channels of the upright members.

The optical arrangement and the dimensions of the plate holder are such that a pair of plates retained in the holder 34 may be simultaneously exposed to the object and reference beams. The nature of the film employed, the optical intensity, and other technical parameters may be the same as those employed with normal double exposure holography.

In operation, the screw 22 is adjusted to provide an initial force on the beam 10 and a single photographic plate is disposed in a holder 34. The laser 28, which is preferably a continuous wave type, is energized for a sufficient period of time to make an initial exposure on the photographic plate. The laser is then extinguished and the screw 22 is adjusted to place a second load on the beam 10. A second photographic plate is then disposed in the other side of the holder 34 and the laser 28 is again energized. This time the first photographic plate receives a second exposure and the newly inserted plate receives a first exposure. After the laser 28 is extinguished the force on the beam 10 is again adjusted by the screw 22, the first photographic plate is removed from the holder for developing, and a new photographic plate is inserted in its stead. This process is continued through the entire range of loadings of interest on the beam 10. On the last loading no new plate is inserted in the holder, but only a single plate, bearing an initial exposure from the next to last loading, is exposed.

After the holograms are developed they may be viewed by reinserting them in the holder and energizing the laser 28. It may be desirable to attenuate the reference beam during the viewing process.

FIGS. 3A and 3B illustrate the optical reconstructions of a pair of beams 10 which are visible through the holograms. A plurality of fringe lines 50 appear on each of the reconstructions. The fringe lines generally represent contour lines of equal displacement of the member between the two plate exposures taken along lines between the photographic plate and the point of interest. Common analytic techniques may be used to convert these fringe lines to more usable contours of equal amplitude of displacement along planes normal to the observed surface of the hologram.

Because the base point of one hologram is the same as the final point of the next, the displacement amplitudes noted in the series of holograms may be algebraically added to determine the gross movement of any point between any two loadings, and interpolations may be between noted points.

The method of the invention as practiced by the apparatus of FIG. 1 thus eliminates any repositioning of the optical setup between holographic exposures and eliminates any delay, and the possible associated dimensional changes of the system, which might occur between the secondary exposure on one plate and the initial exposure on the next plate.

FIG. 4 discloses an alternative form of plate holder which may be substituted for the plate holder 38 and employed with the other apparatus of FIG. 1.

The substitute plate holder, generally indicated at 60, is adapted to retain a single photographic plate between a pair of side channels 62 and 64 and a bottom channel 66 which extends horizontally and joins at its ends to the bottoms of the two side channels. The member 66 is supported on a shaft 68 which has its lower end retained within an indexing mechanism 70. A hand wheel 72 allows the rotational position of the shaft 68 and the plate holder mechanism to be adjusted.

In use, the plate holder 60 is substituted for the plate holder 14 of the apparatus of FIG. 1 and a plate is initially loaded in it. An exposure is then made of the test specimen at the base point of the controlled variable and the laser is extinguished. The controlled variable is modified and a second exposure is then made on the same plate. The laser is again extinguished and the hand wheel 72 is rotated to modify the angular relation of the photographic plate to the other apparatus. This rotation may typically be through five to ten degrees and should be sufficient to rotate a line extending from the plate to the object in the first angular position of the plate, beyond the extreme boundary of the object of the second position.

The laser is then again energized and another exposure of the member is made. The laser is then extinguished, the variable changed, and a second exposure made with the plate in its second angular position. This process is continued with two exposures being made at each angular position of the plate. When the hologram is developed a plurality of optical reconstructions of the image will be visible, depending on the angle between the eyes of the observer and the holographic plate. By rotating the plate, the succession of reconstructions can be observed. Each of the reconstructions will contain the same fringe family as would be visible with holograms formed by the apparatus of FIG. 1.

As has been noted, the time required to rotate the photographic plate introduces some inaccuracy into this technique, with respect to the technique of the first embodiment wherein the basic exposure of one hologram and the second exposure of the previous hologram are made simultaneously. Whether the inaccuracy is sufficient to prevent the use of this technique in a particular experiment is dependent upon both the time required to make the rotation and the variable being studied. For example, if the variable is creep, which is simply a function of time, and the creep occurs at a fairly high rate, this method cannot be employed. On the other hand, if the variable applied to the object is a range of temperatures, and the object can be stabilized at each temperature, this method should be acceptable.

Having thus described my invention, I claim:

1. The method of analyzing the deformation of a member through a range of a controlled variable which is applied to the member, comprising: applying a controlled variable to the member and modifying the controlled variable through a range; forming a plurality of double exposure holograms of the member through double exposures made at different values of the controlled variable, with initial exposure of one double exposure hologram being made at the same value of the controlled variable as the second exposure of another double exposure hologram at all values of the controlled variable intermediate the end points of the range; illuminating the double exposure holograms in succession; and observing the reconstructed images of the member and analyzing the fringe lines which appear in the reconstructed images of the member.

2. The method of claim 1, wherein the controlled variable is modified through a continuous range of values so that the deformation of the member between successive increments of the variable may be summed to provide information relating to deformation of a member resulting from grosser increments of the controlled variable.

3. The method of claim 1, wherein each double exposure hologram is formed by exposing a separate photographic plate to a reference beam and to light reflected from a coherently illuminated object, and by developing the plate.

4. The method of claim 3, wherein a pair of photographic media are exposed to coherent light reflected from the member and to a reference beam simultaneously, at all values of the controlled variable intermediate the end values, with one plate of such pair receiving its second exposure and the other plate of the pair simultaneously receiving its initial exposure.

5. The method of claim 4, wherein the photographic media comprise planar plates which are disposed in side by side parallel relationship to one another during the exposure process.

6. The method of claim 1, wherein all of the holograms are formed on a single photographic media by modifying the angle of the media with respect to the object between successive double exposures, with the angle being the same for both exposures of each hologram.

7. The method of claim 6, wherein the photographic media is retained on a plate holder supported for rotation about an axis normal to the line between the plate and the member.

References Cited

UNITED STATES PATENTS 3,405,614   10/1968   Lin et al.

OTHER REFERENCES

Leith, E. N.: Holography. From Industrial Research, August 1966, pp. 40, 42, and 43.

Cindrich, Ivan: Image Scanning by Rotation of a Hologram. From Applied Optics, September 1967, vol. 6, No. 9, pp. 1531–1534.

JERRY W. MYRACLE, Primary Examiner

U.S. Cl. X.R.

73—67.5; 350—3.5